United States Patent
Hayakawa

(10) Patent No.: US 10,074,384 B2
(45) Date of Patent: Sep. 11, 2018

(54) STATE ESTIMATING APPARATUS, STATE ESTIMATING METHOD, AND STATE ESTIMATING COMPUTER PROGRAM

(71) Applicant: FUJITSU LIMITED, Kawasaki-shi, Kanagawa (JP)

(72) Inventor: Shoji Hayakawa, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 14/179,134

(22) Filed: Feb. 12, 2014

(65) Prior Publication Data
US 2014/0249823 A1  Sep. 4, 2014

(30) Foreign Application Priority Data
Mar. 4, 2013 (JP) .................................. 2013-042261

(51) Int. Cl.
*G10L 25/63* (2013.01)
*G10L 17/26* (2013.01)

(52) U.S. Cl.
CPC ............... *G10L 25/63* (2013.01); *G10L 17/26* (2013.01)

(58) Field of Classification Search
CPC .......... G10L 15/22; G10L 25/63; G10L 17/26
USPC ........................................................ 704/270
See application file for complete search history.

(56) References Cited

U.S. PATENT DOCUMENTS

| | | | | |
|---|---|---|---|---|
| 2006/0122834 A1* | 6/2006 | Bennett | ............... | G10L 15/1822 704/256 |
| 2011/0158225 A1* | 6/2011 | Ishimoto | ............. | H04M 1/2535 370/352 |
| 2011/0282666 A1* | 11/2011 | Washio | ................... | G10L 17/26 704/246 |
| 2011/0295607 A1* | 12/2011 | Krishnan | ................ | G10L 17/26 704/270 |

(Continued)

FOREIGN PATENT DOCUMENTS

| | | |
|---|---|---|
| JP | 8-286693 | 11/1996 |
| JP | 2000-67063 | 3/2000 |

(Continued)

OTHER PUBLICATIONS

Japanese Office Action dated Oct. 25, 2016 in related Japanese Application No. 2013-042261.

(Continued)

*Primary Examiner* — Bharatkumar S Shah
(74) *Attorney, Agent, or Firm* — Staas & Halsey LLP

(57) ABSTRACT

A state estimating apparatus includes: a spectrum calculating unit which calculates a power spectrum for each of a plurality of frequencies on a frame-by-frame basis from a voice signal containing voice of a first speaker and voice of a second speaker transmitted over a telephone line; a band power calculating unit which calculates power of a non-transmission band on a frame-by-frame basis, based on the power spectra of frequencies contained in the non-transmission band among the plurality of frequencies; a transmitted-voice judging unit which determines that any frame whose (Continued)

power in the non-transmission band is greater than a threshold value indicating the presence of voice carries the voice of the first speaker; and a state judging unit which judges whether the state of mind of the first speaker is normal or abnormal, based on the frame judged to carry the voice of the first speaker.

20 Claims, 7 Drawing Sheets

(56) References Cited

U.S. PATENT DOCUMENTS

| | | |
|---|---|---|
| 2012/0209598 A1 | 8/2012 | Hayakawa et al. |
| 2013/0006630 A1 | 1/2013 | Hayakawa et al. |

FOREIGN PATENT DOCUMENTS

| | | |
|---|---|---|
| JP | 2008-124627 | 5/2008 |
| JP | 2008-304718 | 12/2008 |
| JP | 2010-277023 | 12/2010 |
| JP | 2011-242755 | 12/2011 |
| JP | 2012-168296 | 9/2012 |

OTHER PUBLICATIONS

Naoshi Matsuo et al., "Detection of overtrust situations based on the non-verbal information", vol. 1, No. 450, pp. 57-62, IEICE Technical Report, Japan, The Institute of Electronics, Information and Communication Engineers, Feb. 21, 2013.

* cited by examiner

STATE ESTIMATING APPARATUS, STATE ESTIMATING METHOD, AND STATE ESTIMATING COMPUTER PROGRAM

CROSS-REFERENCE TO RELATED APPLICATION

This application is based upon and claims the benefit of priority of the prior Japanese Patent Application No. 2013-042261, filed on Mar. 4, 2013, the entire contents of which are incorporated herein by reference.

FIELD

The embodiments discussed herein are related to a state estimating apparatus, a state estimating method, and a state estimating computer program for judging whether the state of mind of a speaker is normal or abnormal, based on the voice of the speaker engaged in voice communication over a telephone line.

BACKGROUND

In recent years, fraud and other malicious solicitations conducted using telephones with an aim to defraud people out of money have become a social problem. To address this, techniques have been proposed for estimating a speaker's state of mind by monitoring the speaker's voice during voice telephone communications (For example, refer to Japanese Laid-open Patent Publication Nos. 2011-242755 and 2012-168296 and U.S. Patent Application No. 2013/0006630).

For example, an utterance state detection apparatus disclosed in Japanese Laid-open Patent Publication No. 2011-242755 extracts high-frequency components from the results of the frequency analysis of a speaker's utterance data, and calculates the degree of variation of the high-frequency components per unit time. Then, the utterance state detection apparatus detects the vocal utterance state of the specific speaker, based on the statistics obtained from the specific speaker's utterance data, the statistics being calculated section by section based on a plurality of degrees of variation during a predetermined period of time.

On the other hand, a suppressed state detection apparatus disclosed in Japanese Laid-open Patent Publication No. 2012-168296 analyzes input voice by dividing the input voice into a plurality of frames, and calculates the average value of the analysis results. The suppressed state detection apparatus determines a threshold value, based on the calculated average value of the analysis results and on statistical data concerning the average values of the analysis results prestored for a plurality of speakers and the cumulative frequency distribution of the analysis results, and calculates the frequency of occurrence of analysis results having values larger than the threshold value among the plurality of analysis results. Then, based on the frequency of occurrence, the suppressed state detection apparatus judges the state of tension of the vocal cords producing the voice.

A state detection apparatus disclosed in U.S. Patent Application No. 2013/0006630 calculates a plurality of statistics for feature parameters from a speaker's utterance data. Then, based on the feature parameter statistics of the speaker's utterance data and those of reference utterance data representing vocal utterance in a normal state, the state detection apparatus creates pseudo-utterance data having at least one statistic that matches one of the statistics of the reference utterance data. Then, based on the feature parameter statistics regarding the speaker's utterance data and the pseudo-utterance data, the state detection apparatus calculates feature parameter statistics regarding the synthesized utterance data obtained by replacing portions of the pseudo-utterance data with the corresponding portions of the speaker's input utterance data. The state detection apparatus detects an abnormal state of the speaker, based on the difference between the feature parameter statistics of the synthesized utterance data and those of the reference utterance data.

The above techniques are based on the assumption that the voice of the speaker at the transmitting end and the voice of the speaker at the receiving end are captured separately. To capture the voice of the speaker at the transmitting end and the voice of the speaker at the receiving end separately, a voice communication recording adapter is connected, for example, between the telephone base unit and the handset. Then, the state estimating apparatus estimates the state of the speaker by acquiring through the adapter a voice signal from the transmitting end and a voice signal from the receiving end separately. In this case, the voice signals that can be acquired through the voice communication recording adapter are limited to the voice signals arising from the voice communication being conducted over the telephone unit to which the voice communication recording adapter is connected. Therefore, if a plurality of telephone units are connected to one telephone line, and if the voice communication recording adapter is connected to only one of the plurality of telephone units, the state estimating apparatus is unable to estimate the state of the speaker from the voice communication being conducted on any other telephone unit than that one telephone unit. On the other hand, if the voice communication recording adapter is connected between the modular rosette and the distributor, and if the state estimating apparatus is adapted to acquire voice signals from the voice communication recording adapter thus connected, voice signals can be acquired from the voice communication being conducted on any of the telephone units connected to the distributor. However, in this case, any voice signal that can be obtained from the voice communication recording adapter is a voice signal containing the voice from the speaker at the transmitting end and the voice from the speaker at the receiving end in a mixed fashion. Therefore, if the above techniques that are based on the assumption that the voice of the speaker at the transmitting end and the voice of the speaker at the receiving end are captured separately are applied to such voice signals, it is difficult to achieve a sufficient estimation accuracy. This is because the voice of the other speaker is superimposed on the voice of the intended speaker, which means that the features of the voice of the other speaker are included in the features of the voice used to estimate the state of the intended speaker. On the other hand, a technique is proposed that separates sounds from two sound sources by estimating parameters of a sine wave superimposition model (for example, refer to Japanese Laid-open Patent Publication No. 2008-304718).

SUMMARY

In the technique disclosed in Japanese Laid-open Patent Publication No. 2008-304718, a term representing noise is not included in the sine wave model. However, since noise generated from a sound source located in the vicinity of the speaker is superimposed on the speaker's voice in actual voice communication, the speaker's voice may not be able to be accurately separated from the voice signals recorded during actual voice communication.

According to one embodiment, a state estimating apparatus is provided. The state estimating apparatus includes: a spectrum calculating unit which calculates a power spectrum for each of a plurality of frequencies on a frame-by-frame basis, each frame having a predetermined time length, from a voice signal containing voice of a first speaker and voice of a second speaker transmitted over a telephone line; a band power calculating unit which calculates power of a non-transmission band on a frame-by-frame basis, based on the power spectra of frequencies contained in the non-transmission band among the plurality of frequencies, the non-transmission band being a frequency band over which the voice signal is attenuated by a telephone band filter during transmission over the telephone line; a transmitted-voice judging unit which determines that any frame whose power in the non-transmission band is greater than a threshold value indicating the presence of voice carries the voice of the first speaker; and a state judging unit which judges whether the state of mind of the first speaker is normal or abnormal, based on the frame judged to carry the voice of the first speaker.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

State estimating apparatus will be described below with reference to the accompanying drawings.

By noting the difference between the frequency characteristic of a voice signal transmitted over a telephone line and the frequency characteristic of a voice signal before transmission over a telephone line, the state estimating apparatus of the invention identifies frames containing transmitting-end voice from a voice signal that contains the voice from the speaker at the transmitting end and the voice from the speaker at the receiving end in a mixed fashion.

In the embodiments discussed herein, the end at which the state estimating apparatus is installed is designated as the transmitting end, and the remote end engaged in voice communication with the transmitting end over a telephone line is designated as the receiving end.

Figure 1:
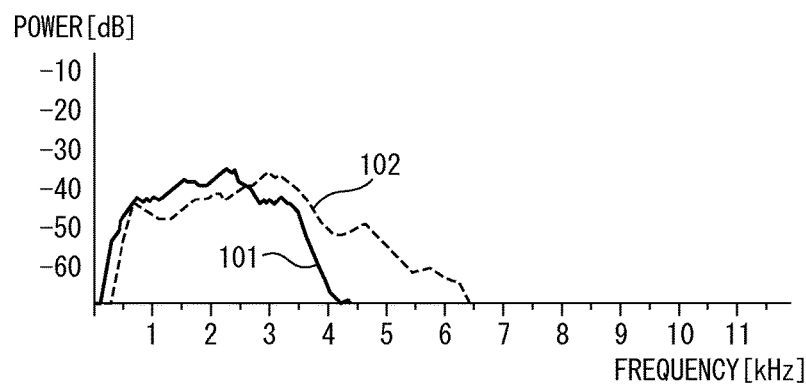
FIG. 1 is a diagram illustrating one example of the frequency characteristic of a voice signal from the transmitting end versus the frequency characteristic of a voice signal from the receiving end.

FIG. 1 is a diagram illustrating one example of the frequency characteristic of the voice signal from the transmitting end versus the frequency characteristic of the voice signal from the receiving end. In FIG. 1, the abscissa represents the frequency (kHz), and the ordinate represents the power spectral intensity (dB). Graph 101 depicts the frequency characteristic of the voice signal from the receiving end, and graph 102 depicts the frequency characteristic of the voice signal from the transmitting end.

In voice communications conducted over telephone lines, since voice signals are multiplexed and transmitted from one exchange to the next, the voice signal frequency band is restricted to 0.3 kHz to 3.4 kHz, and other frequency components are attenuated by telephone band filters during transmission. As a result, the power spectrum of the voice signal from the receiving end abruptly drops when the frequency exceeds 3.4 kHz. On the other hand, the voice signal from the transmitting end, which is about to be transmitted over the telephone line, is not limited in bandwidth and therefore has relatively large power even at frequencies higher than 3.4 kHz. "Speaker recognition using speaker individual information in the higher frequency band" by Hayakawa et al., Journal of the Acoustical Society of Japan, 51(11), pp. 861-868, 1995, describes that the speaker recognition rate improves as information from higher frequencies is used. This means that spectral components of the speaker's voice are also contained in the frequency band above 3.4 kHz.

In view of this, the state estimating apparatus examines frame by frame the frequency characteristics of the voice signal containing the voice from the speaker at the transmitting end and the voice from the speaker at the receiving end in a mixed fashion, and determines that any frame containing spectral components other than those within the frequency band limited due to transmission over a telephone line carry the voice of the speaker speaking at the transmitting end.

Figure 2:
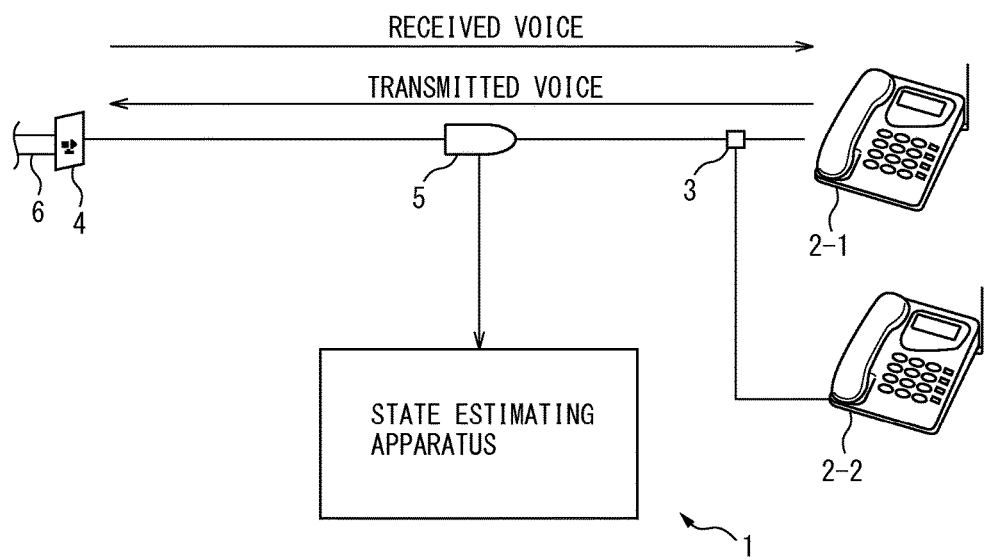
FIG. 2 is a diagram illustrating one example of where a state estimating apparatus is connected to a telephone line according to one embodiment.

FIG. 2 is a diagram illustrating one example of where the state estimating apparatus is connected to the telephone line according to one embodiment. In this embodiment, the state estimating apparatus 1 acquires a voice signal from a voice communication recording adapter 5 connected between a modular rosette 4 and a distributor 3 to which two telephone units 2-1 and 2-2 are connected. As a result, the voice signal containing the voice from the speaker at the transmitting end passes through the voice communication recording adapter 5, whichever telephone unit 2-1 or 2-2 the speaker at the transmitting end may use. On the other hand, the voice signal containing the voice from the speaker at the receiving end is transmitted over the telephone line 6 to one or the other of the telephone units via the modular rosette 4 and via the voice communication recording adapter 5. As a result, the voice signal that the voice communication recording adapter 5 outputs to the state estimating apparatus 1 is an analog signal that contains the voice from the speaker at the transmitting end and the voice from the speaker at the receiving end in a mixed fashion.

Figure 3:
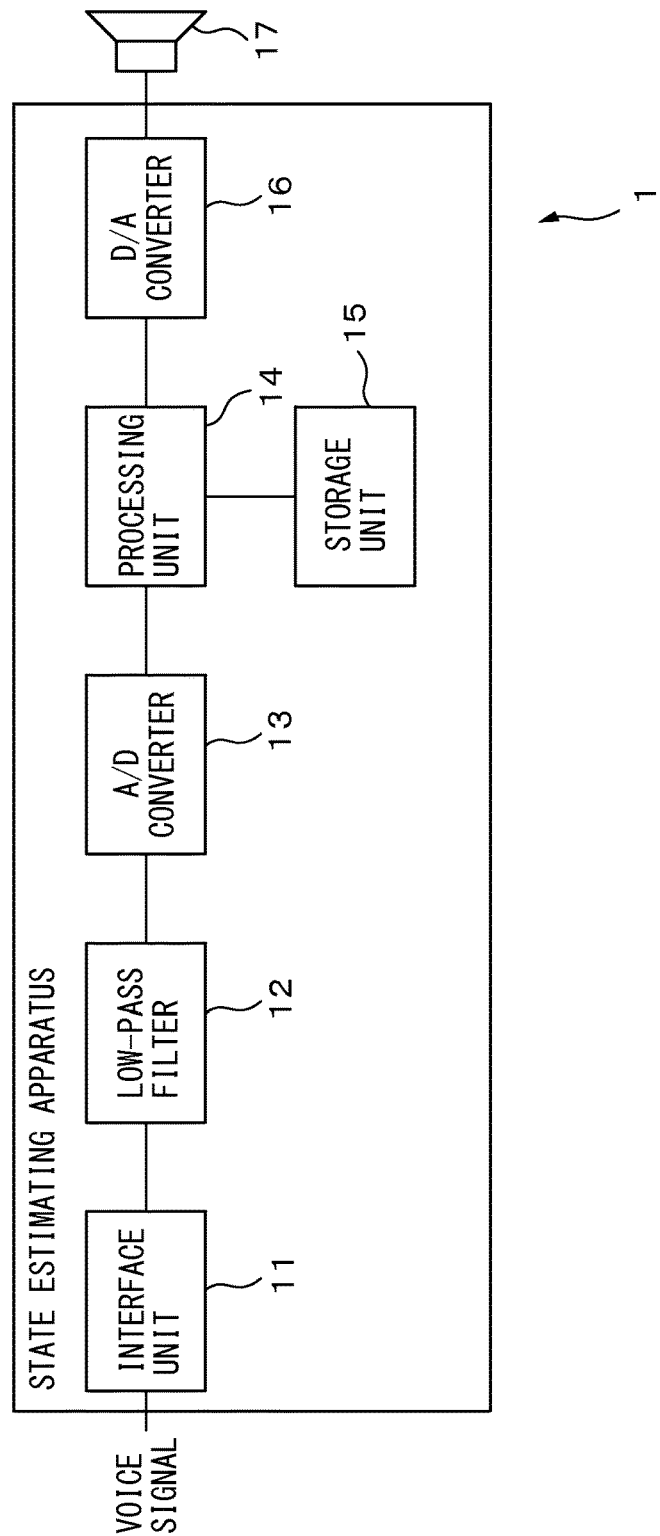
FIG. 3 is a diagram schematically illustrating the configuration of the state estimating apparatus according to the one embodiment.

FIG. 3 is a diagram schematically illustrating the configuration of the state estimating apparatus according to the one embodiment. The state estimating apparatus 1 includes an interface unit 11, a low-pass filter 12, an analog/digital converter 13, a processing unit 14, a storage unit 15, a digital/analog converter 16, and a loudspeaker 17.

The interface unit 11 is one example of a voice input unit, and includes an audio interface. The interface unit 11 acquires a voice signal as an analog signal from the voice communication recording adapter 5, and passes the voice signal to the low-pass filter 12. The low-pass filter 12 attenuates frequency components of the voice signal that are higher than the Nyquist frequency (one-half the frequency defining the sampling rate) determined by the sampling rate of the analog/digital converter 13 (hereinafter referred to as the A/D converter) in order to suppress the aliasing due to the signal sampling at the A/D converter 13. The voice signal whose high-frequency components have been attenuated is input to the A/D converter 13. The A/D converter 13 digitizes the analog voice signal by sampling it at a prescribed sampling rate. The sampling rate of the A/D converter 13 is chosen so that the digitized voice signal can retain frequency components higher than the upper limit (3.4 kHz) of the frequency band of the voice signal transmitted over the telephone line 6. If the state estimating apparatus 1 is configured to determine whether the voice is from the transmitting end or the receiving end by using, for example, the power spectrum of a frequency band of 3.4 kHz to 4.0 kHz, the sampling rate is set to 8 kHz or higher so that the Nyquist frequency becomes 4.0 kHz or higher. Generally, since the voice from the transmitting end also contains the components falling within a frequency band of 4 kHz to 8 kHz, it is preferable to set the sampling rate to 16 kHz or higher. The A/D converter 13 passes the digitized voice signal to the processing unit 14.

The processing unit 14 includes one or a plurality of processors, a memory circuit, and their peripheral circuitry. Based on the digitized voice signal, the processing unit 14 identifies the frames containing the voice from the speaker at the transmitting end. Then, based on the frames containing the voice from the speaker at the transmitting end, the processing unit 14 determines whether the state of mind of the speaker at the transmitting end is normal or abnormal. The details of the processing performed by the processing unit 14 will be described later.

The storage unit 15 includes, for example, a readable/writable nonvolatile semiconductor memory and a readable/writable volatile semiconductor memory. The storage unit 15 stores various kinds of data to be used for the state estimation performed by the processing unit 14, and also stores various kinds of data generated during the process of the state estimation. The storage unit 15 further stores an audible alarm signal which is output from the loudspeaker 17 when it is determined by the processing unit 14 that the state of mind of the speaker at the transmitting end is abnormal.

When it is determined by the processing unit 14 that the state of mind of the speaker at the transmitting end is abnormal, the digital/analog converter 16 (hereinafter referred to as the D/A converter) converts the audible alarm signal output from the processing unit 14 into an analog signal which is output to the loudspeaker 17. The loudspeaker 17 reproduces the analog audible alarm signal.

Figure 4:
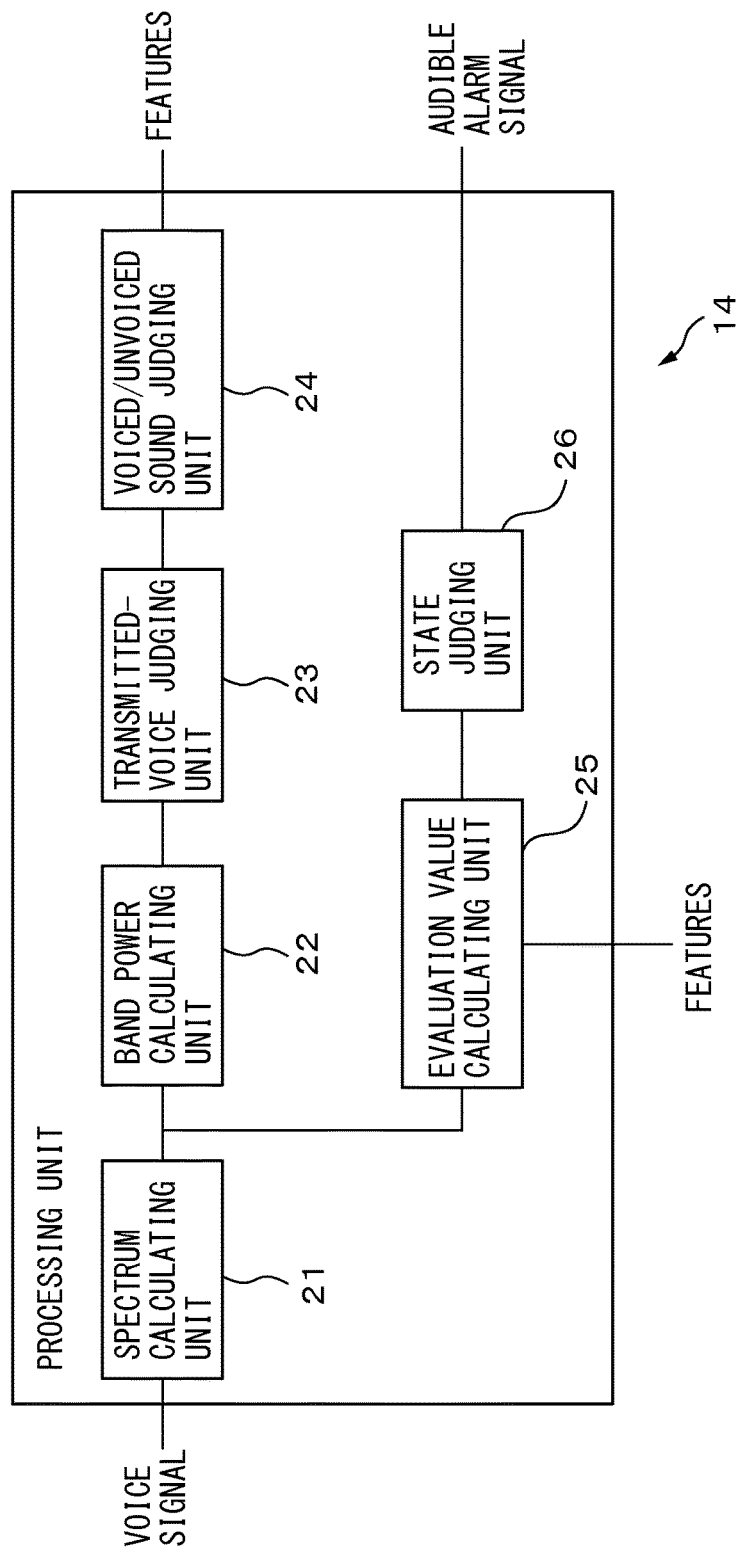
FIG. 4 is a functional block diagram of a processing unit contained in the state estimating apparatus.

FIG. 4 is a functional block diagram of the processing unit 14. The processing unit 14 includes a spectrum calculating unit 21, a band power calculating unit 22, a transmitted-voice judging unit 23, a voiced/unvoiced sound judging unit 24, an evaluation value calculating unit 25, and a state judging unit 26. These units constituting the processing unit 14 are functional modules implemented, for example, by executing a computer program on a processor contained in the processing unit 14.

The spectrum calculating unit 21 divides the digitized voice signal (hereinafter simply referred to as the voice signal) into frames each having a predetermined length. The frame length is set, for example, to 32 msec. The spectrum calculating unit 21 may allow any two adjacent frames to partially overlap each other. In this case, the spectrum calculating unit 21 may set the amount of frame shift, to be introduced into the new frame when moving from the current frame to the next frame, for example, to 10 msec to 16 msec.

The spectrum calculating unit 21 transforms the voice signal in the time domain into a spectral signal in the frequency domain on a frame-by-frame basis by using a time-to-frequency transform. The spectrum calculating unit 21 may use, for example, a fast Fourier transform (FFT) or a modified discrete cosine transform (MDCT) as the time-to-frequency transform. The spectrum calculating unit 21 may perform the time-to-frequency transform after multiplying each frame by a windowing function such as a Hamming or Hanning window. If the frame length is 32 msec, and the sampling rate of the A/D converter 13 is 16 kHz, for example, there are 512 sample points per frame; therefore, the spectrum calculating unit 21 applies a 512-point FFT.

The spectrum calculating unit 21 calculates a power spectrum for each frequency from a spectral signal for each frequency on a frame-by-frame basis. Then, the spectrum calculating unit 21 passes the power spectrum of each frequency on a frame-by-frame basis to the band power calculating unit 22 and the evaluation value calculating unit 25.

The band power calculating unit 22 calculates power of a non-transmission band on a frame-by-frame basis, based on the power spectra of frequencies contained in the non-transmission band, the non-transmission band being a frequency band over which the voice signal is attenuated during transmission over the telephone line. The power of the non-transmission band will hereinafter be simply referred to as the non-transmission band power. In the present embodiment, the band power calculating unit 22 calculates the non-transmission band power by integrating the power spectra over the non-transmission band which is set so as not to overlap the frequency band of the voice signal transmitted over the telephone line. For example, suppose that the sampling rate is 16 kHz, the frame length is 32 msec, the power spectrum of each frequency is calculated by a 512-point FFT, and the non-transmission band is 3.4 kHz to 6.0 kHz; then, the band power calculating unit 22 calculates the non-transmission band power in accordance with the following equation.

$$P = 10\log_{10}\left\{\sum_{f=109}^{192} |S(f)|^2\right\} \text{ (dB)} \tag{1}$$

where S(f) is the spectral signal at frequency f, and $|S(f)|^2$ is the power spectrum at frequency f. P is the non-transmission band power.

The upper limit of the non-transmission band need not necessarily be limited to 6.0 kHz. The upper limit of the non-transmission band need only be set higher than 3.4 kHz, the upper-limit frequency of the voice signal transmitted over the telephone line, but not higher than one-half of the sampling rate of the A/D converter 13. On the other hand, the lower limit of the non-transmission band is set not lower than 3.4 kHz which is the upper-limit frequency of the voice signal transmitted over the telephone line. It is preferable to set the lower limit of the non-transmission band as close as possible to 3.4 kHz, because if the lower limit of the non-transmission band is set too high, hardly any voice components of the speaker from the transmitting end will be contained in the non-transmission band.

The band power calculating unit 22 passes the non-transmission band power P and the power spectrum of each frequency to the transmitted-voice judging unit 23 on a frame-by-frame basis.

The transmitted-voice judging unit 23 compares the non-transmission band power P on a frame-by-frame basis with a transmitted-voice judging threshold value. If the non-transmission band power P is greater than the transmitted-voice judging threshold value, the transmitted-voice judging unit 23 determines that the current frame contains the voice of the speaker from the transmitting end. On the other hand, if the non-transmission band power P is not greater than the transmitted-voice judging threshold value, the transmitted-voice judging unit 23 determines that the frame does not contain the voice of the speaker from the transmitting end. The transmitted-voice judging threshold value provides a criterion based on which to judge whether the speaker's voice is contained in the non-transmission band, and the value is set appropriately, for example, according to the characteristics of the voice communication recording adapter 5 and the A/D converter 13. The transmitted-voice judging threshold value is set, for example, to 45 dB to 50 dB.

Further, it is preferable to set the transmitted-voice judging threshold value adaptively according to the background noise level of the voice during voice communication. For this purpose, the transmitted-voice judging unit 23 judges any frame containing neither the voice of the speaker from the transmitting end nor the voice of the speaker from the receiving end as being a silent frame that contains only background noise. For example, if the value of the power spectrum integrated over the entire frequency band of the frame is smaller than a predetermined power threshold value, the transmitted-voice judging unit 23 judges the frame to be a silent frame. Then, the transmitted-voice judging unit 23 estimates the background noise level based on the non-transmission band power of the silent frame. For example, the transmitted-voice judging unit 23 estimates the background noise level in accordance with the following equation.

$$\text{noise}P'=0.01 \cdot Ps+0.99 \cdot \text{noise}P \qquad (2)$$

where Ps is the non-transmission band power of the most recent silent frame, and noiseP is the background noise level before updating. Then, noiseP' is the background noise level after updating. In this case, the transmitted-voice judging threshold value Th1 is calculated, for example, in accordance with the following equation.

$$Th1=\text{noise}P+\gamma \qquad (3)$$

where $\gamma$ is a preset constant which is set, for example, to such a value that the non-transmission band power of any frame containing a vowel uttered by the speaker at the transmitting end in an quiet environment can be differentiated from that of the voice uttered by the speaker at the receiving end.

If the frame is judged to contain the voice of the speaker from the transmitting end, the transmitted-voice judging unit 23 passes the power spectrum of each frequency contained in that frame to the voiced/unvoiced sound judging unit 24. On the other hand, if the frame is judged not to contain the voice of the speaker from the transmitting end, the transmitted-voice judging unit 23 discards the power spectrum of any frequency contained in that frame.

The voiced/unvoiced sound judging unit 24 checks to see whether the voice contained in the frame judged to contain the voice of the speaker from the transmitting end (for convenience, hereinafter referred to as the transmitted-voice frame) is a voiced sound or an unvoiced sound, and uses the frame judged to contain a voiced sound of the speaker from the transmitting end in order to estimate the state of mind of the speaker at the transmitting end.

Generally, it is known that when the speaker is put in a mentally stained or stressed condition, a change will occur in the open/close motion of the speaker's vocal cords, and a voiced sound containing a vowel will be affected by such a change in the vocal cord open/close motion. Therefore, the frame containing a voiced sound is useful for estimating the state of mind of the speaker. Further, a voiced sound contains a pitch frequency which is also affected by a change in the vocal cord open/close motion.

In view of the above, the voiced/unvoiced sound judging unit 24 calculates the largest value among the peak values (excluding peak values with zero time difference) of an autocorrelation function or modified autocorrelation function for the transmitted-voice frame. For any frame corresponding to a human's voiced sound, the degree of autocorrelation is relatively high, while on the other hand, for any frame corresponding to an unvoiced sound or background noise, the degree of autocorrelation is low. Therefore, the voiced/unvoiced sound judging unit 24 compares the largest peak value with a predetermined threshold value and, if the largest value is larger than the predetermined threshold value, then determines that the transmitted-voice frame contains a voiced sound of the speaker from the transmitting end. Then, the voiced/unvoiced sound judging unit 24 calculates the pitch frequency by taking the reciprocal of the time difference corresponding to the largest peak value. The autocorrelation function is obtained by inverse Fourier transforming the power spectrum of each frequency. On the other hand, the modified autocorrelation function is obtained by first applying linear predictive coding filtering to the power spectrum and then inverse Fourier transforming the result of the filtering.

Alternatively, the voiced/unvoiced sound judging unit 24 may determine, based on the number of zero crossings, whether the transmitted-voice frame contains a voiced sound of the speaker from the transmitting end. When using the number of zero crossing, the voiced/unvoiced sound judging unit 24 counts the number of points where the time-varying curve of the voice signal in the transmitted-voice frame crosses zero. Then, if the number of zero crossings is smaller than a predetermined threshold value, for example, the voiced/unvoiced sound judging unit 24 determines that the transmitted-voice frame contains a voiced sound of the speaker from the transmitting end.

When it is determined that the transmitted-voice frame contains a voiced sound of the speaker from the transmitting end, the voiced/unvoiced sound judging unit 24 passes the pitch frequency of the transmitted-voice frame and the value of the power spectrum integrated over the entire frequency band of the frame to the storage unit 15 for storing. Further, the voiced/unvoiced sound judging unit 24 increments by one the total number N of transmitted-voice frames judged to contain a voiced sound of the speaker from the transmitting end among the frames so far detected after the start of the voice communication, and stores the incremented total number N in the storage unit 15.

From the pitch frequencies and the power spectrum integrated values stored in the storage unit 15 up to the end of the voice communication for the transmitted-voice frames judged to contain a voiced sound of the speaker from the transmitting end, the evaluation value calculating unit 25 calculates the evaluation value indicating the state of mind of the speaker at the transmitting end. For simplicity, the transmitted-voice frames judged to contain a voiced sound of the speaker from the transmitting end will hereinafter be referred to as the voiced frames.

In the present embodiment, the evaluation value calculating unit 25 calculates the evaluation value after the end of the voice communication. For example, when the silent frame for which the value of the power spectrum integrated over the entire frequency band of the frame is smaller than the predetermined power threshold value has been detected successively for a predetermined period of time, the evaluation value calculating unit 25 determines that the voice communication has ended. The predetermined period of time is set, for example, to 30 seconds. If it is determined that the voice communication has not ended yet, the evaluation value calculating unit 25 does not calculate the evaluation value at that time.

On the other hand, if it is determined that the voice communication has ended, the evaluation value calculating unit 25 calculates the evaluation value. For this purpose, the evaluation value calculating unit 25 accesses the storage unit 15 to read out the pitch frequencies and the power spectrum integrated values associated with the voiced frames and the total number N of voiced frames that occurred during the period from the beginning to the end of the voice communication.

The evaluation value calculating unit 25 calculates the average value $pitch_{mean}$ of the pitch frequencies of the respective voiced frames. Then, the evaluation value calculating unit 25 calculates the number, Npitch, of voiced frames that satisfy the following condition.

$$\alpha \cdot pitch_{mean} < pitch \quad (4)$$

where pitch is the pitch frequency of the voiced frame of interest. The coefficient $\alpha$ is set, for example, to 1.1 to 2.0. The Npitch represents the total number of voiced frames each of whose pitch frequencies is higher by at least a predetermined value than the average value of the pitch frequencies of the voiced frames detected during the voice communication. The evaluation value calculating unit 25 calculates from the following equation the frequency of occurrence, Ppitch, of voiced frames each having a pitch frequency higher than the average value of the pitch frequencies by at least the predetermined value.

$$Ppitch = Npitch/N \quad (5)$$

The greater is the strain applied to the speaker at the transmitting end, the smaller is the frequency of occurrence Ppitch.

Further, the evaluation value calculating unit 25 calculates the average value $power_{mean}$ of the power spectrum integrated values of the respective voiced frames. Then, the evaluation value calculating unit 25 calculates the number, Npower, of voiced frames that satisfy the following condition.

$$\beta + \log_{10}(power_{mean}) < \log_{10}(power) \quad (6)$$

where power is the power spectrum integrated value of the voiced frame of interest. The coefficient $\beta$ is set, for example, to 0.5 to 1.0. The Npower represents the total number of voiced frames each of whose power spectrum integrated values is larger by at least a predetermined value than the average value of the power spectrum integrated values of the voiced frames detected during the voice communication. The evaluation value calculating unit 25 calculates from the following equation the frequency of occurrence, Ppower, of voiced frames each having a power spectrum integrated value larger than the average value of the power spectrum integrated values by at least the predetermined value.

$$Ppower = Npower/N \quad (7)$$

The greater is the strain applied to the speaker at the transmitting end, the larger is the frequency of occurrence Ppower.

The evaluation value calculating unit 25 calculates a modified cumulative power spectral distribution $Pdf_{power}$ by subtracting the frequency of occurrence, Ppower, of voiced frames each having a power spectrum integrated value larger by at least the predetermined value than the average value of the power spectrum integrated values from a prescribed normalization constant SCORENORM in accordance with the following equation.

$$Pdf_{power} = \begin{cases} SCORENORM - Ppower & (SCORENORM > Ppower) \\ 0 & (SCORENORM \le Ppower) \end{cases} \quad (8)$$

Since the frequency of occurrence Ppower increases as the strain applied to the speaker at the transmitting end becomes greater, the modified cumulative power spectral distribution $Pdf_{power}$ becomes smaller in value as the strain applied to the speaker at the transmitting end becomes greater. The normalization constant SCORENORM is set, for example, to 0.03.

Further, the evaluation value calculating unit 25 calculates a modified cumulative pitch frequency distribution $Pdf_{pitch}$ by multiplying the frequency of occurrence, Ppitch, of voiced frames each having a pitch frequency higher by at least the predetermined value than the average value of the pitch frequencies by a prescribed normalization coefficient PITCHNORM in accordance with the following equation.

$$Pdf_{pitch} = PITCHNORM \cdot Ppitch \quad (9)$$

The normalization coefficient PITCHNORM is set, for example, to 1.0 so that the order of the modified cumulative pitch frequency distribution $Pdf_{pitch}$ becomes approximately equal to the order of the modified cumulative power spectral distribution $Pdf_{power}$. Since the frequency of occurrence Ppitch decreases as the strain applied to the speaker at the transmitting end becomes greater, the modified cumulative pitch frequency distribution $Pdf_{pitch}$ becomes smaller in value as the strain applied to the speaker at the transmitting end becomes greater.

Based on the modified cumulative pitch frequency distribution $Pdf_{pitch}$ and the modified cumulative power spectral distribution $Pdf_{power}$, the evaluation value calculating unit 25 calculates the evaluation value SCORE indicating the state of mind of the speaker at the transmitting end in accordance with the following equation.

$$SCORE = \sqrt{Pdf_{pitch}^2 + Pdf_{power}^2} \quad (10)$$

In the present embodiment, the smaller the evaluation value SCORE is, the higher is the probability that the state of mind of the speaker at the transmitting end is abnormal.

The evaluation value calculating unit 25 passes the evaluation value SCORE to the state judging unit 26.

The state judging unit 26 judges whether the evaluation value SCORE satisfies the condition indicating that the state of mind of the speaker at the transmitting end is abnormal. If the evaluation value SCORE satisfies the condition, the state judging unit 26 determines that the state of mind of the speaker at the transmitting end is abnormal. In the present embodiment, the state judging unit 26 compares the evaluation value SCORE with an abnormality judging threshold value Th2. If the evaluation value SCORE is lower than the abnormality judging threshold value Th2, the evaluation value SCORE satisfies the condition indicating that the state of mind of the speaker at the transmitting end is abnormal, and therefore, the state judging unit 26 determines that the state of mind of the speaker at the transmitting end is abnormal. On the other hand, if the evaluation value SCORE is not lower than the abnormality judging threshold value Th2, the state judging unit 26 determines that the state of mind of the speaker at the transmitting end is normal. For example, the abnormality judging threshold value Th2 is chosen so that the Mahalanobis distance between the abnormality judging threshold value Th2 and the average value of the evaluation values SCOREs of a plurality of speakers whose state of mind is normal becomes equal to the Mahalanobis distance between the abnormality judging threshold value Th2 and the average value of the evaluation values SCOREs of a plurality of speakers whose state of mind is abnormal.

If it is determined that the state of mind of the speaker at the transmitting end is abnormal, the state judging unit 26 reads out the audible alarm signal from the storage unit 15. Then, the state judging unit 26 outputs the audible alarm signal to the loudspeaker 17 via the D/A converter 16.

Alternatively, the state estimating apparatus 1 may use an alarm light source. In that case, the state judging unit 26 that has determined that the state of mind of the speaker at the transmitting end is abnormal may issue an alarm to the speaker at the transmitting end by lighting or flashing the light source.

Figure 5:
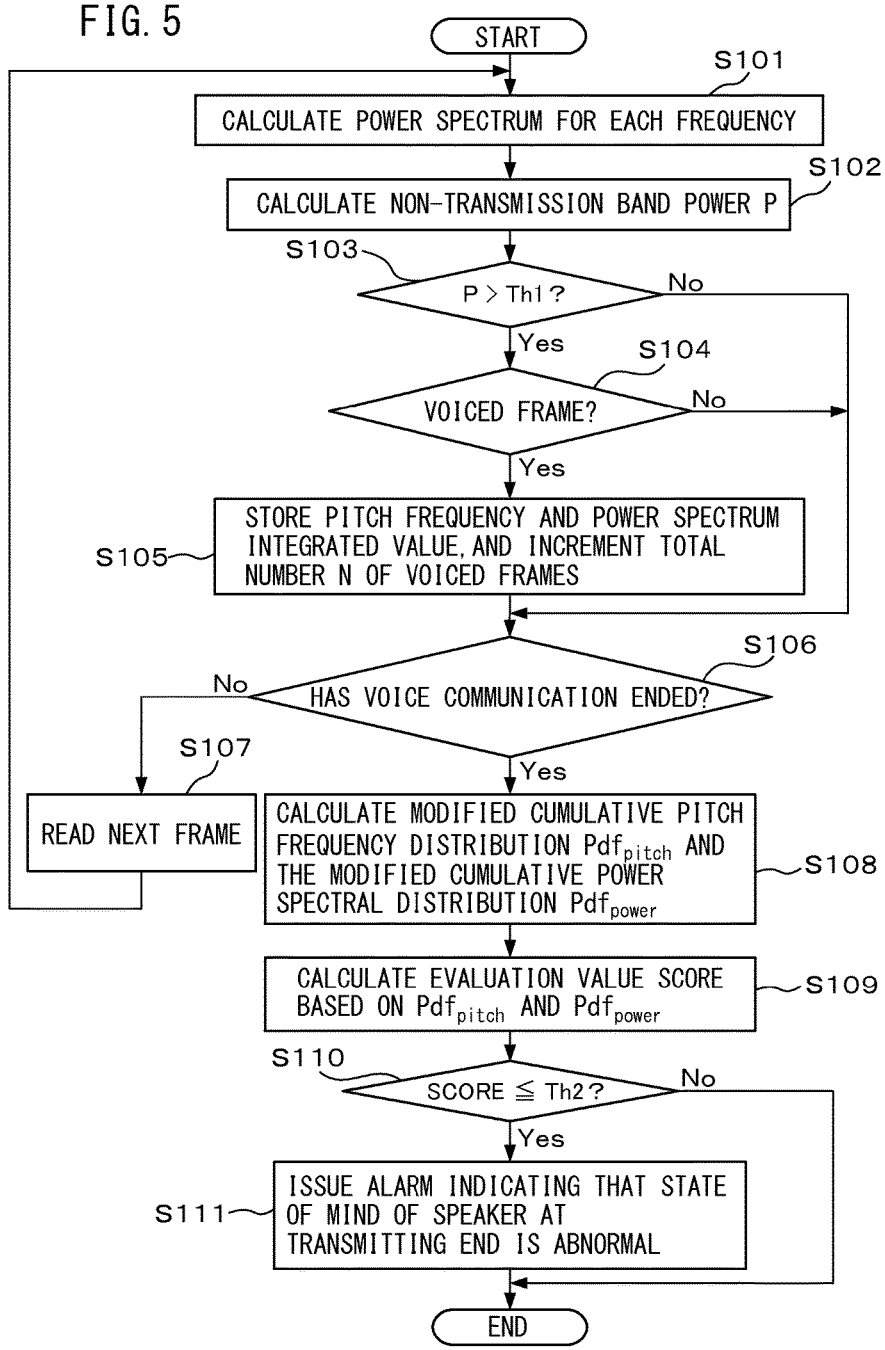
FIG. 5 is an operation flowchart of a state estimation process.

FIG. 5 is an operation flowchart of a state estimation process. The processing unit 14 carries out the state estimation process in accordance with the following flowchart each time a voice communication call is initiated. For initialization, the processing unit 14 deletes the pitch frequency and the power spectrum integrated value stored in the storage unit 15, and resets the total number N of voiced frames to 0.

The spectrum calculating unit 21 in the processing unit 14 calculates the power spectrum for each frequency in the current frame by time-to-frequency transforming the voice signal on a frame-by-frame basis (step S101). The spectrum calculating unit 21 passes the power spectrum for each frequency in the current frame to the band power calculating unit 22 in the processing unit 14.

The band power calculating unit 22 calculates, for the current frame, the non-transmission band power P of frequencies higher than the upper limit of the frequency band of the voice signal transmitted over the telephone line (step S102). Then, the band power calculating unit 22 passes the non-transmission band power P of the current frame and the power spectrum of each frequency to the transmitted-voice judging unit 23.

The transmitted-voice judging unit 23 judges whether the non-transmission band power P is greater than the transmitted-voice judging threshold value Th1 (step S103). If the non-transmission band power P is not greater than the transmitted-voice judging threshold value Th1 (No in step S103), the transmitted-voice judging unit 23 determines that the current frame is not a transmitted-voice frame. On the other hand, if the non-transmission band power P is greater than the transmitted-voice judging threshold value Th1 (Yes in step S103), the transmitted-voice judging unit 23 determines that the current frame is a transmitted-voice frame. Then, the transmitted-voice judging unit 23 passes the power spectrum of each frequency in the current frame to the voiced/unvoiced sound judging unit 24.

The voiced/unvoiced sound judging unit 24 judges whether the current frame is a voiced frame or not, based on the autocorrelation peak, etc. of the current frame (step S104). If the current frame is a voiced frame (Yes in step S104), the voiced/unvoiced sound judging unit 24 calculates the pitch frequency and the power spectrum integrated value of the current frame as features, and stores them in the storage unit 15 (step S105). In addition, the voiced/unvoiced sound judging unit 24 increments by one the total number N of voiced frames as counted from the start of the voice communication.

After step S105, the evaluation value calculating unit 25 in the processing unit 14 judges whether the voice communication has ended (step S106). If it is determined in step S103 that the current frame is not a transmitted-voice frame (No in step S103), or if the current frame is not a voiced frame (No in step S104), the evaluation value calculating unit 25 also judges whether the voice communication has ended (step S106). If the voice communication has not ended yet (No in step S106), the processing unit 14 reads the next frame (step S107). Then, the processing unit 14 repeats the process starting from step S101 by setting that next frame as the current frame.

On the other hand, if the voice communication has ended (Yes in step S106), the evaluation value calculating unit 25 calculates the modified cumulative pitch frequency distribution $Pdf_{pitch}$ and the modified cumulative power spectral distribution $Pdf_{power}$ (step S108). Then, based on the modified cumulative pitch frequency distribution $Pdf_{pitch}$ and the modified cumulative power spectral distribution $Pdf_{power}$, the evaluation value calculating unit 25 calculates the evaluation value SCORE, and passes the evaluation value SCORE to the state judging unit 26 (step S109).

The state judging unit 26 determines whether or not the evaluation value SCORE is equal to or lower than the state judging threshold value Th2 (step S110). If the evaluation value SCORE is equal to or lower than the state judging threshold value Th2 (Yes in step S110), the state judging unit 26 determines that the state of mind of the speaker at the transmitting end is abnormal. Then, the state judging unit 26 issues an alarm indicating that the state of mind of the speaker at the transmitting end is abnormal (step S111).

After step S111, the processing unit 14 terminates the state estimation process. On the other hand, if the evaluation value SCORE is higher than the state judging threshold value Th2 (No in step S110), the state judging unit 26 determines that the state of mind of the speaker at the transmitting end is normal. In this case, the processing unit 14 terminates the state estimation process without issuing an alarm.

As has been described above, the state estimating apparatus examines frame by frame the non-transmission band power, i.e., the power of the frequency band that lies outside the frequency band of the voice signal transmitted over the telephone line, from the voice signal containing the voice from the speaker at the transmitting end and the voice from the speaker at the receiving end in a mixed fashion. In this way, the state estimating apparatus can discriminate any frame containing the voice from the speaker at the transmitting end. Since the features of the voice of the speaker at the transmitting end can be examined by discriminating it from the voice of the speaker at the receiving end, the state estimating apparatus can properly estimate the state of mind of the speaker at the transmitting end.

Next, a state estimating apparatus according to a second embodiment will be described. The state estimating apparatus according to the second embodiment estimates the state of mind of the speaker at the transmitting end by utilizing information concerning keywords detected from the voice uttered by the speaker at the receiving end. The state estimating apparatus according to the second embodiment differs from the state estimating apparatus according to the first embodiment only in the configuration of the processing unit. Therefore, the following description deals only with the processing unit.

Figure 6:
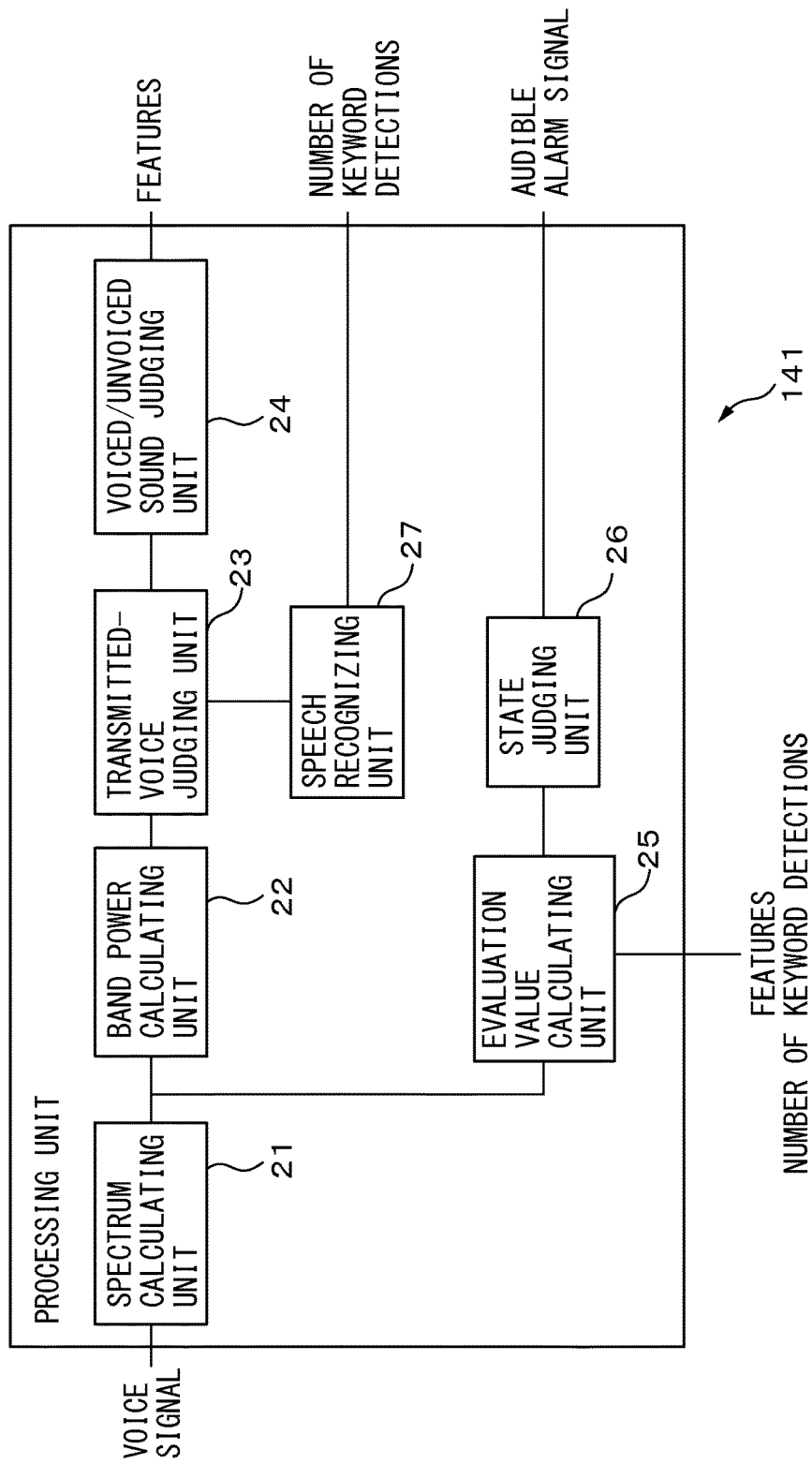
FIG. 6 is a functional block diagram of a processing unit contained in a state estimating apparatus according to a second embodiment.

FIG. 6 is a functional block diagram of the processing unit 141 according to the second embodiment. The processing unit 141 according to the second embodiment includes a spectrum calculating unit 21, a band power calculating unit 22, a transmitted-voice judging unit 23, a voiced/unvoiced sound judging unit 24, an evaluation value calculating unit 25, a state judging unit 26, and a speech recognizing unit 27. These units constituting the processing unit 141 are functional modules implemented, for example, by executing a computer program on a processor contained in the processing unit 141.

In FIG. 6, corresponding component elements to those in the processing unit 14 of the first embodiment depicted in FIG. 4 are designated by the same reference numerals. The processing unit 141 of the second embodiment differs from the processing unit 14 of the first embodiment by the inclusion of the speech recognizing unit 27. The following therefore describes the speech recognizing unit 27 and its associated parts.

The transmitted-voice judging unit 23 calculates the value of the power spectrum integrated over the entire frequency band of each frame that has been judged as not being a transmitted-voice frame. If the integrated value is not smaller than a predetermined power threshold value, the transmitted-voice judging unit 23 determines that the frame is a frame that contains the voice from the speaker at the receiving end. Then, the transmitted-voice judging unit 23 passes the power spectrum of each frequency contained in the frame to the speech recognizing unit 27. For convenience, the frame that contains the voice from the speaker at the receiving end will hereinafter be referred to as the received-voice frame.

The speech recognizing unit 27 performs speech recognition on the received-voice frame and detects a keyword that may be used to mentally strain the speaker at the transmitting end.

In the present embodiment, the speech recognizing unit 27 detects a keyword by using a word dictionary containing one or more keywords to be recognized and an acoustic model constructed in advance. The word dictionary and the acoustic model are stored in advance in the storage unit 15. The keywords may include words or phrases, such as "hurry", "remit", "account number", "password number", etc., that a person who is trying to defraud another person over a telephone, for example, in a bank transfer fraud, is highly likely to utter. The acoustic model is constructed by dividing the sound of each word into phonetic units such as phonemes or syllables and by concatenating unit acoustic models corresponding to such phonetic units. The unit acoustic models and the acoustic model are each constructed using, for example, a hidden Markov model (HMM).

The speech recognizing unit 27 extracts a feature to be used for speech recognition, for example, from the received-voice frame. For this purpose, the speech recognizing unit 27 extracts, for example, a Mel Frequency Cepstral Coefficient (MFCC) as the feature. Alternatively, the speech recognizing unit 27 may obtain a power difference between successive received-voice frames. When obtaining a MFCC as the feature, the speech recognizing unit 27 first converts the power spectrum of each frequency, for example, to a power value in the Mel scale, and then calculates the MFCC by applying a frequency transform such as MDCT to the logarithm of the power value. When obtaining an inter-frame power difference as the feature, the speech recognizing unit 27 obtains the power difference by calculating the difference between two successive received-voice frames in terms of the integrated value of the power spectrum taken over the entire frequency band.

Alternatively, the speech recognizing unit 27 may extract any of various other features (for example, fundamental frequency) that are used as features in speech recognition using an acoustic model. Further, the speech recognizing unit 27 may extract a plurality of kinds of features from each received-voice frame to which speech recognition is to be applied.

The speech recognizing unit 27 obtains the degree of similarity between the sequence of features constructed by arranging one or more features extracted from each received-voice frame along a time axis and the acoustic model constructed by concatenating HMMs representing the unit acoustic models for each keyword contained in the word dictionary. Then, the speech recognizing unit 27 detects a keyword for which the degree of similarity is largest and the degree of similarity is larger than a predetermined threshold value.

The speech recognizing unit 27 may detect keywords by using other speech recognition techniques such as dynamic time warping.

Each time a keyword is detected, the speech recognizing unit 27 reads out a keyword counter indicating the total number of detected keywords from the storage unit 15, and increments the keyword counter by one. And each time the keyword counter is incremented by one, the speech recognizing unit 27 stores the keyword counter in the storage unit 15. The speech recognizing unit 27 may store a count of the number of detections for each keyword in the storage unit 15.

The evaluation value calculating unit 25 corrects the evaluation value SCORE in accordance with the total number of keywords detected from the received-voice frames. In the present embodiment, the larger the number of detected keywords, the more like that the speaker at the transmitting end is mentally strained. In view of this, as the number of detected keywords becomes larger, the evaluation value calculating unit 25 makes the evaluation value SCORE smaller so that the condition for determining that the state of mind of the speaker at the transmitting end is abnormal becomes easier to satisfy. For example, the evaluation value calculating unit 25 corrects the evaluation value in accordance with the following equation.

$$SCORE' = 0.9^{Nk/R} \cdot SCORE \tag{11}$$

where SCORE' is the corrected evaluation value. Further, Nk represents the total number of detected keywords, and R is a given constant which is, for example, 10.

The evaluation value calculating unit 25 may weight the amount of correction of the evaluation value SCORE in accordance with the detected keyword. For example, in equation (11), the evaluation value calculating unit 25 may use, instead of the total number Nk of detected keywords, the sum $\Sigma N(i)w(i)$ of the values each obtained by multiplying the number of detections $N(i)$ of a particular keyword by the weighting coefficient $w(i)$ of that particular keyword. In this case, the weighting coefficient $w(i)$ is set to a larger value for a keyword that is more likely to appear when trying to put the speaker at the transmitting end in a strained state. In the calculation of the evaluation value, the way of combining the number of detections for each detected keyword is not limited to that defined by equation (11), but the combination need only be made so that the SCORE becomes smaller as the number of detected keywords becomes larger.

The evaluation value calculating unit 25 passes the corrected evaluation value to the state judging unit 26. The state judging unit 26 compares the corrected evaluation value with the state judging threshold value Th2. If the corrected evaluation value is not larger than the state judging threshold value Th2, the state judging unit 26 determines that the state of mind of the speaker at the transmitting end is abnormal. On the other hand, if the corrected evaluation value is larger than the state judging threshold value Th2, the state judging unit 26 determines that the state of mind of the speaker at the transmitting end is normal.

According to the above embodiment, since the state estimating apparatus can discriminate any frame containing the voice from the speaker at the receiving end, the number of keywords detected from such frames can be used to estimate the state of mind of the speaker at the transmitting end. In this way, the state estimating apparatus can further enhance the accuracy with which the state of mind of the speaker at the transmitting end is estimated.

According to a modified example, keywords (hereinafter referred to as malicious keywords) that may appear in a specific kind of voice call, such as a voice call intended to entice people to remit money, can be used as the keywords to be detected. In this case, the state judging unit 26 may determine based on the evaluation value SCORE that the state of mind of the speaker at the transmitting end is abnormal, and may determine that the ongoing voice call is the specific kind of voice call when the total number of detected malicious keywords has exceeded a predetermined threshold value (for example, 10).

Figure 7:
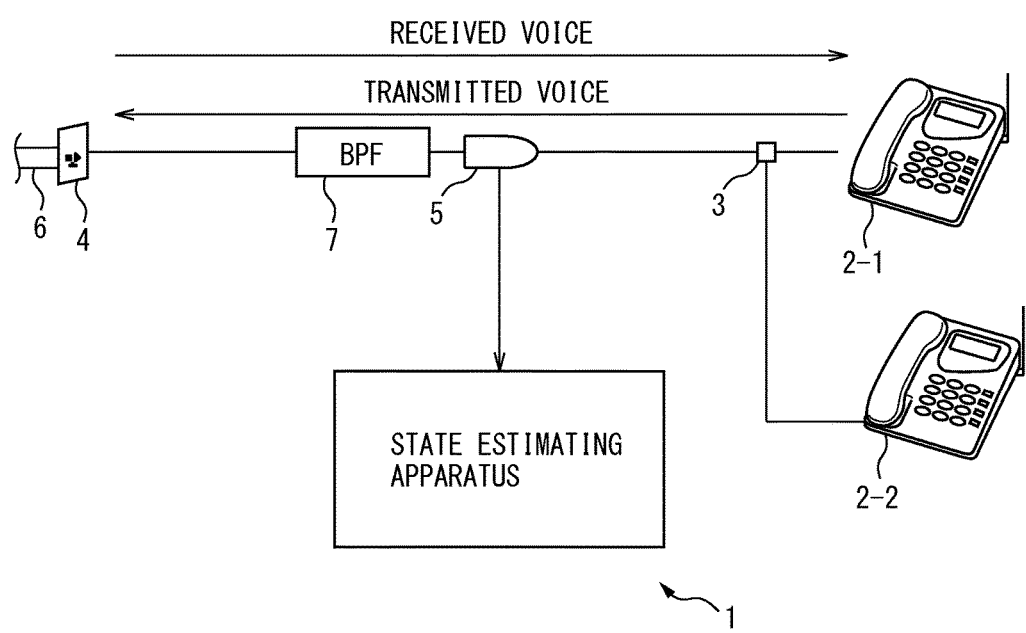
FIG. 7 is a diagram illustrating an alternative example of where the state estimating apparatus is connected to the telephone line according to a modified embodiment.

FIG. 7 is a diagram illustrating an alternative example of where the state estimating apparatus is connected to the telephone line according to a modified embodiment. In FIG. 7, corresponding component elements to those in FIG. 2 are designated by the same reference numerals. In this modified example, a band-pass filter 7 is connected between the modular rosette 4 and the voice communication recording adapter 5 in order to further clearly differentiate the frequency band of a transmitted-voice frame from the frequency band of a received-voice frame. The band-pass filter 7 transmits only the frequencies falling within the frequency band (0.3 kHz to 3.4 kHz) of the voice signal transmitted over the telephone line. Accordingly, the band power calculating unit 22 in the state estimating apparatus 1 may also use the power spectrum of the frequencies lower than 0.3 kHz for the calculation of the non-transmission band power P.

According to another modified example, the processing unit may calculate the evaluation value when the number of detected voiced frames reaches or exceeds a predetermined number or each time it reaches an integral multiple of the predetermined number, and may determine based on the evaluation value whether the state of mind of the speaker at the transmitting end is abnormal or not. The predetermined number here is, for example, 100 to 1000. According to this modified example, since the state estimating apparatus can warn the speaker at the transmitting end whenever the speaker's state of mind becomes abnormal during the voice communication, the speaker at the transmitting end can be given a chance to bring himself/herself back to a normal state of mind or to disconnect the voice communication before some form of loss is caused to him/her while he is in an abnormal state of mind.

According to still another modified example, the features representing the speaker's state of mind are not restricted to the pitch frequency and the power integrated value. The evaluation value calculating unit may calculate the evaluation value, based on some other suitable feature extracted from the voiced frame as representing the speaker's state of mind. Further, the evaluation value calculating unit may calculate the evaluation value by also using a feature, for example, the power spectrum integrated value, extracted from a transmitted-voice frame that is judged not to be a voiced frame. The evaluation value calculating unit may also calculate the evaluation value such that as the evaluation value becomes larger, the state of mind of the speaker at the transmitting end becomes more likely to be judged abnormal. For example, the evaluation value calculating unit may calculate the evaluation value by taking the reciprocal of the earlier described evaluation value SCORE.

The state estimating apparatus may be incorporated into a mobile telephone.

Figure 8:
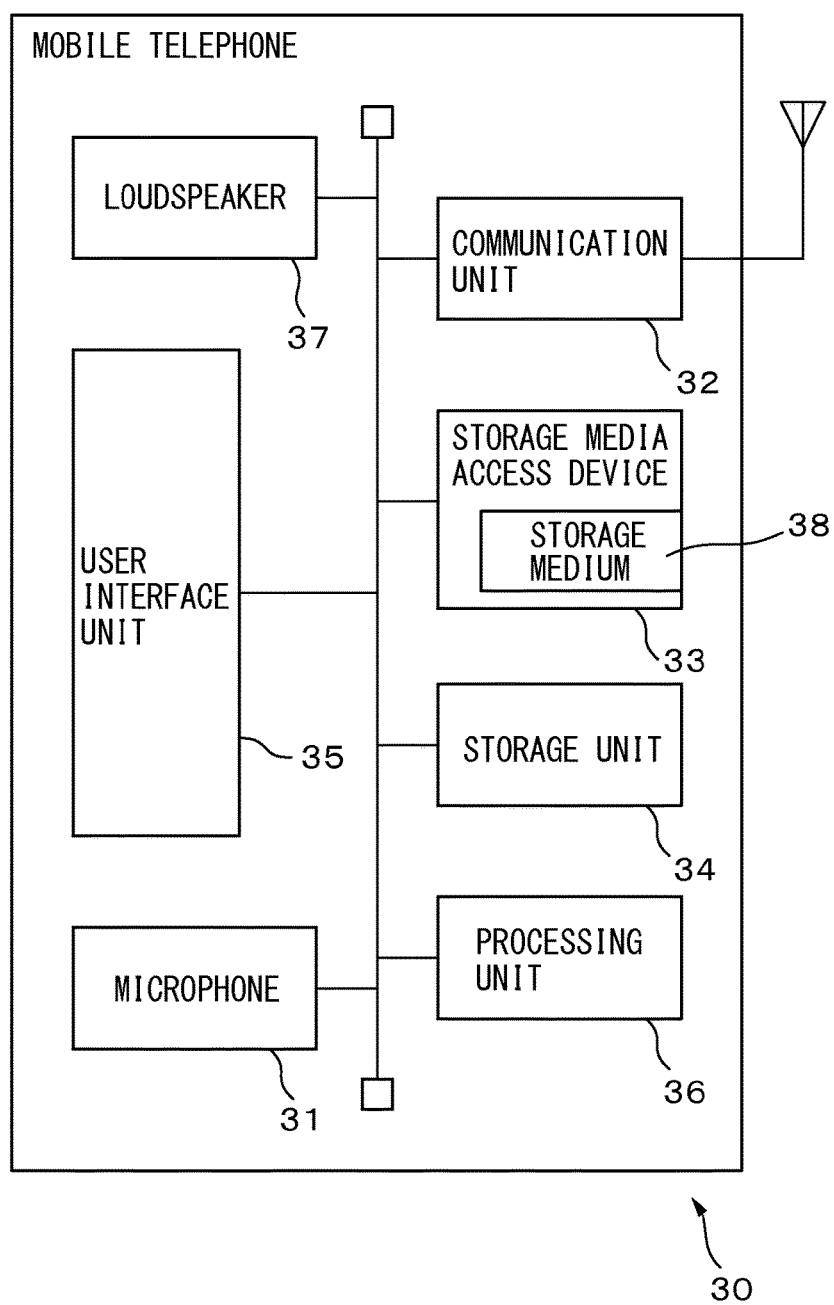
FIG. 8 is a diagram schematically illustrating the configuration of a mobile telephone incorporating the state estimating apparatus according to any one of the above embodiments or their modified examples.

FIG. 8 is a diagram schematically illustrating the configuration of a mobile telephone incorporating the state estimating apparatus according to any one of the above embodiments or their modified examples. The mobile telephone 30 includes a microphone 31, a communication unit 32, a storage media access device 33, a storage unit 34, a user interface unit 35, a processing unit 36, and a loudspeaker 37.

The microphone 31, which is one example of a sound capturing unit, generates an analog voice signal by capturing voice produced by the speaker at the transmitting end who is located near the microphone 31, and passes the analog voice signal to an A/D converter (not depicted). The A/D converter digitizes the analog voice signal by sampling it at a prescribed sampling rate, and outputs the digitized voice signal. The A/D converter passes the digitized voice signal to the processing unit 36.

The communication unit 32 includes a wireless communication circuit for connecting the mobile telephone 30 to a telephone line via a base station. The communication unit 32 receives a data stream containing a downlink voice signal which is an electrical representation of the voice produced by the speaker at the receiving end and transmitted over the telephone line via the base station. Then, the communication unit 32 extracts the downlink voice signal from the data stream. The communication unit 32 passes the downlink voice signal to the processing unit 36.

The storage media access device 33 is a device for accessing a storage medium 38 such as a semiconductor memory card. The storage media access device 33 reads out a computer program stored, for example, on the storage medium 38 and to be executed on the processing unit 36, and passes the computer program to the processing unit 36. The storage media access device 33 may read out, for example, a state estimating computer program from the storage medium 38, and may pass it to the processing unit 36.

The storage unit 34 includes, for example, a readable/writable nonvolatile semiconductor memory and a readable/writable volatile semiconductor memory. The storage unit 34 stores various kinds of data and various kinds of application programs to be executed on the processing unit 36. The storage unit 34 may also store the computer program for executing the state estimation process according to any one of the above embodiments or their modified examples and various kinds of data to be used in the state estimation process. The storage unit 34 may further store a voice signal generated by combining the voice signal acquired through the microphone 31 and the downlink voice signal acquired by the communication unit 32.

The user interface unit 35 includes, for example, an input device such as a device having a plurality of operating keys, and a display device such as a liquid crystal display. Alternatively, the user interface unit 35 may include a device, such as a touch panel display, into which an input device and a display device are integrated. The user interface unit 35 generates an operation signal in response to the operation of the input device performed by the speaker at the transmitting end, and passes the operation signal to the processing unit 36. The user interface unit 35 also receives various kinds of information from the processing unit 36 and displays them on the display device. Further, the user interface unit 35 is one example of an output unit for outputting an alarm, and may display on the display device an alarm message received from the processing unit 36 when the state of mind of the speaker at the transmitting end is judged abnormal by the processing unit 36.

The processing unit 36 includes one or a plurality of processors, a memory circuit, and their peripheral circuitry. The processing unit 36 is connected to each unit of the mobile telephone 30 via a signal line, and controls each unit of the mobile telephone 30. Further, the processing unit 36 performs various kinds of processing such as making a call setup in response to an operation performed by the speaker or in response to the arrival of a paging signal and maintaining the established communication call. When the communication is started, the processing unit 36 acquires the voice signal generated by combining the voice signal acquired through the microphone 31 and the downlink voice signal acquired by the communication unit 32. Then, by processing the combined voice signal in accordance with the state estimation process performed by the processing unit in the state estimating apparatus according to any one of the above embodiments, the processing unit 36 determines whether the state of mind of the speaker at the transmitting end is abnormal or not. In the illustrated example, the processing unit 36 can know the starting and ending of the communication via an application programming interface (API) provided by a telephone application included in the mobile telephone 30. As a result, the processing unit 36 need not detect the silent section in order to know the ending of the communication.

In the illustrated example, if the state of mind of the speaker at the transmitting end is judged abnormal, the processing unit 36 causes the user interface 35 to display an alarm message on the display device. Alternatively, the processing unit 36 may cause the loudspeaker 37 as another example of the output unit to reproduce an alarm message voice signal. Further alternatively, the processing unit 36 may be configured so that if the state of mind of the speaker at the transmitting end is judged abnormal, an alarm mail message notifying that the state of mind of the speaker at the transmitting end has been judged abnormal is automatically transmitted to a predesignated authorized person's mail address by using the electronic mail function of the mobile telephone 30.

A computer program for causing a computer to implement the various functions of the processing unit in the state estimating apparatus according to any one of the above embodiments or their modified examples may be provided in the form recorded on a computer readable medium such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A state estimating apparatus comprising:
a processor configured to:
  calculate a power spectrum for each of a plurality of frequencies on a frame-by-frame basis, each frame having a predetermined time length, from a voice signal containing both voice not transmitted over a telephone line, of a first speaker at a transmitted end, and voice transmitted over the telephone line, of a second speaker at a receiving end;
  calculate power of a non-transmission band on a frame-by-frame basis, based on the power spectra of frequencies contained in the non-transmission band among the plurality of frequencies, the non-transmission band being a frequency band over which the voice signal is attenuated by a telephone band filter during transmission over the telephone line;
  determine that any frame whose power in the non-transmission band is greater than a threshold value indicating the presence of voice carries the voice of the first speaker; judge whether a state of mind of the first speaker is normal or abnormal, based on the frame judged to carry the voice of the first speaker;
  output, via an outputting device, an alarm signal when the state of mind of the first speaker is judged to be abnormal.

2. The state estimating apparatus according to claim 1, wherein the processor is further configured to judge whether or not the frame judged to carry the voice of the first speaker contains a voiced sound, and wherein
  the processor judges whether the state of mind of the first speaker is normal or abnormal, based on the frame judged to carry the voice of the first speaker and contain a voiced sound.

3. The state estimating apparatus according to claim 1, wherein the determination of the frame which carries the voice of the first speaker sets the
  threshold value to a value larger than the power of background noise in the non-transmission band.

4. The state estimating apparatus according to claim 1, further comprising an analog/digital converter which samples the voice signal at a sampling rate two or more times an upper limit frequency of the non-transmission band.

5. The state estimating apparatus according to claim 2, wherein the processor is further configured to calculate an evaluation value representing the state of mind of the first speaker, based on features obtained as quantities representing the state of mind of the speaker from the frame judged to carry the voice of the first speaker and contain a voiced sound, and wherein
when the evaluation value satisfies a condition indicating that the state of mind of the first speaker is abnormal, the processor judges the state of mind of the first speaker to be abnormal.

6. The state estimating apparatus according to claim 5, wherein each time any given frame judged to carry the voice of the first speaker is judged to contain a voiced sound, the judging whether or not the frame judged to carry the voice of the first speaker contains a voiced sound obtains a pitch frequency and an integrated value of the power spectrum at each frequency as the features from the given frame, and wherein
the processor calculates the evaluation value, based on a statistic representing the frequency of occurrence, among a plurality of frames judged to carry the voice of the first speaker and contain a voiced sound, of frames each of whose pitch frequencies is at least a predetermined value higher than an average of the pitch frequencies obtained from the plurality of frames, and on a statistic representing the frequency of occurrence, among the plurality of frames judged to carry the voice of the first speaker and contain a voiced sound, of frames each of whose power spectrum integrated values is at least a predetermined value larger than an average of the integrated values of the power spectra obtained from the plurality of frames.

7. The state estimating apparatus according to claim 5, wherein the processor is further configured to detect, from each frame whose power in the non-transmission band is not greater than the threshold value, any keyword that may be used to mentally strain the first speaker, and wherein
the calculating the evaluation value corrects the evaluation value so that the condition becomes easier to satisfy as the number of detected keywords becomes larger.

8. The state estimating apparatus according to claim 7, wherein the keywords are keywords associated with a specific kind of voice call, and wherein
when the number of detected keywords is equal to or larger than a predetermined number, and when the state of mind of the first speaker is judged to be abnormal, the judging whether the state of mind of the first speaker is normal or abnormal determines that the specific kind of voice call is being conducted.

9. A state estimating method comprising:
calculating a power spectrum for each of a plurality of frequencies on a frame-by-frame basis, each frame having a predetermined time length, from a voice signal containing both voice not transmitted over a telephone line, of a first speaker at a transmitted end, and voice transmitted over the telephone line, of a second speaker at a receiving end;
calculating power of a non-transmission band on a frame-by-frame basis, based on the power spectra of frequencies contained in the non-transmission band among the plurality of frequencies, the non-transmission band being a frequency band over which the voice signal is attenuated by a telephone band filter during transmission over the telephone line;
determining that any frame whose power in the non-transmission band is greater than a threshold value indicating the presence of voice carries the voice of the first speaker;
judging whether a state of mind of the first speaker is normal or abnormal, based on the frame judged to carry the voice of the first speaker; and
outputting, by an outputting device, an alarm signal when the state of mind of the first speaker is judged to be abnormal.

10. The state estimating method according to claim 9, further comprising: judging whether or not the frame judged to carry the voice of the first speaker contains a voiced sound, and wherein
the judging whether the state of mind of the first speaker is normal or abnormal judges whether the state of mind of the first speaker is normal or abnormal, based on the frame judged to carry the voice of the first speaker and contain a voiced sound.

11. The state estimating method according to claim 9, wherein the determination of the frame which carries the voice of the first speaker sets the threshold
value to a value larger than the power of background noise in the non-transmission band.

12. The state estimating method according to claim 9, further comprising: sampling the voice signal at a sampling rate two or more times an upper limit frequency of the non-transmission band.

13. The state estimating method according to claim 10, further comprising: calculating an evaluation value representing the state of mind of the first speaker, based on features obtained as quantities representing the state of mind of the speaker from the frame judged to carry the voice of the first speaker and contain a voiced sound, and wherein
when the evaluation value satisfies a condition indicating that the state of mind of the first speaker is abnormal, the judging whether the state of mind of the first speaker is normal or abnormal judges the state of mind of the first speaker to be abnormal.

14. The state estimating method according to claim 13, wherein each time any given frame judged to carry the voice of the first speaker is judged to contain a voiced sound, the judging whether or not the frame judged to carry the voice of the first speaker contains a voiced sound obtains a pitch frequency and an integrated value of the power spectrum at each frequency as the features from the given frame, and wherein
the calculating the evaluation value calculates the evaluation value, based on a statistic representing the frequency of occurrence, among a plurality of frames judged to carry the voice of the first speaker and contain a voiced sound, of frames each of whose pitch frequencies is at least a predetermined value higher than an average of the pitch frequencies obtained from the plurality of frames, and on a statistic representing the frequency of occurrence, among the plurality of frames judged to carry the voice of the first speaker and contain a voiced sound, of frames each of whose power spectrum integrated values is at least a predetermined value larger than an average of the integrated values of the power spectra obtained from the plurality of frames.

15. The state estimating method according to claim 13, further comprising: detecting, from each frame whose power in the non-transmission band is not greater than the threshold value, any keyword that may be used to mentally strain the first speaker, and wherein the calculating the evaluation value corrects the evaluation value so that the condition becomes easier to satisfy as the number of detected keywords becomes larger.

16. The state estimating method according to claim 15, wherein the keywords are keywords associated with a specific kind of voice call, and wherein
when the number of detected keywords is equal to or larger than a predetermined number, and when the state of mind of the first speaker is judged to be abnormal, the judging whether the state of mind of the first speaker is normal or abnormal determines that the specific kind of voice call is being conducted.

17. A non-transitory computer-readable recording medium having recorded thereon a state estimating computer program that causes a computer to execute a process comprising:
calculating a power spectrum for each of a plurality of frequencies on a frame-by-frame basis, each frame having a predetermined time length, from a voice signal containing both voice not transmitted over a telephone line, of a first speaker at a transmitted end, and voice transmitted over the telephone line, of a second speaker at a receiving end;
calculating power of a non-transmission band on a frame-by-frame basis, based on the power spectra of frequencies contained in the non-transmission band among the plurality of frequencies, the non-transmission band being a frequency band over which the voice signal is attenuated by a telephone band filter during transmission over the telephone line;
determining that any frame whose power in the non-transmission band is greater than a threshold value indicating the presence of voice carries the voice of the first speaker;
judging whether a state of mind of the first speaker is normal or abnormal, based on the frame judged to carry the voice of the first speaker; and
outputting, via an outputting device, an alarm signal when the state of mind of the first speaker is judged to be abnormal.

18. A telephone apparatus-unit comprising:
a microphone which generates a first voice signal by capturing voice of a first speaker at a transmitted end;
a communication circuit which receives a second voice signal containing voice of a second speaker at a receiving end transmitted over a telephone line; a processor adapted to
calculate a power spectrum for each of a plurality of frequencies on a frame-by-frame basis, each frame having a predetermined time length, from a combined voice signal
produced by combining the first voice signal not transmitted over the telephone line and the second voice signal,
calculate power of a non-transmission band on a frame-by-frame basis, based on the power spectra of frequencies contained in the non-transmission band among the plurality of frequencies, the non-transmission band being a frequency band over which the voice signal is attenuated by a telephone band filter during transmission over the telephone line,
determine that any frame whose power in the non-transmission band is greater than a threshold value indicating the presence of voice carries the voice of the first speaker, and judge whether a state of mind of the first speaker is normal or abnormal, based on the frame judged to carry the voice of the first speaker; and
an output device which displays an alarm message when the state of mind of the first speaker is judged to be abnormal.

19. The state estimating apparatus according to claim 1, wherein the voice signal is sampled at a certain sampling frequency, and the non-transmission band is lower than the sampling frequency.

20. The state estimating apparatus according to claim 1, wherein the processor is further configured to judge whether or not, for each frame judged to carry the voice of the first speaker, the voice of the first speaker contained in the frame is a voiced sound or an unvoiced sound, and the processor judges whether the state of mind of the first speaker is normal or abnormal, based on the frame judged to carry the voice of the first speaker and contain a voiced sound.

* * * * *